INVENTOR
GERHARD Bobst
BY Jacobi & Davidson
His Attorney

PATENTED OCT. 1, 1968

3,403,628

United States Patent Office

Patented Oct. 1, 1968

3,403,628
HYDRAULIC CONTROL APPARATUS
Gerhard Bobst, Oensingen, Switzerland, assignor to Von Roll AG., Gerlafingen, Switzerland, a corporation of Switzerland
Filed Aug. 22, 1966, Ser. No. 574,240
Claims priority, application Switzerland, Aug. 27, 1965, 12,088/65
9 Claims. (Cl. 103—38)

ABSTRACT OF THE DISCLOSURE

A hydraulic control apparatus, particularly for stroke adjustable reciprocating pump means. The hydraulic control apparatus comprises a regulating means which includes a measuring component and an adjusting means operably influenced by the regulating means. The operating pressure of the hydraulic system is continuously applied to both the adjusting means and the measuring component included within the regulating means. Further means, comprising spring members acting in opposite directions upon the measuring component are provided for applying a restoring force to the measuring component which opposes the operating pressure of the system. The adjusting means includes a movable member which serves to change the magnitude of the restoring force as a function of the position of the movable member.

---

The present invention relates to an improved hydraulic control apparatus, in particular for stroke adjustable piston or reciprocating pumps, and is of the type incorporating a pre-control or regulating means and adjusting elements influenced by such regulating means, wherein the operating or working pressure effective at the adjusting elements acts upon a measuring component of the regulating means, and wherein a restoring force directed opposite to the operating pressure acts upon the regulating means.

Control devices for hydraulic installations are already known to the art. However, they have possessed the drawback that, depending upon the required regulation criterion, a relatively large expenditure was necessary.

Now, a primary object of the present invention is to provide an improved hydraulic control apparatus, particularly for stroke adjustable reciprocating or piston pumps which possesses a control or operating characteristic which is dependent upon operating pressure and is of relatively simple construction and renders possible a quickly responding control or regulation.

Generally speaking, the inventive hydraulic control apparatus is characterized by the provision of means which renders possible a change in the magnitude of the restoring force as a function of its position. Owing to the inventive control apparatus it is possible to achieve a desired regulation characteristic in considerably simpler manner than was heretofore possible.

Figure 1:
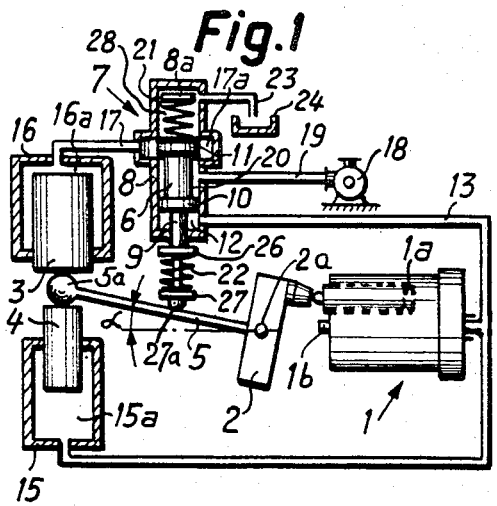
Figure 2:
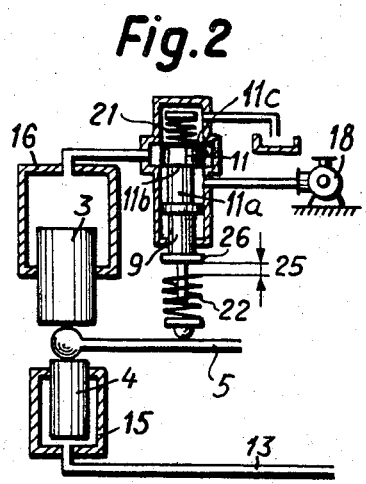
Figure 3:
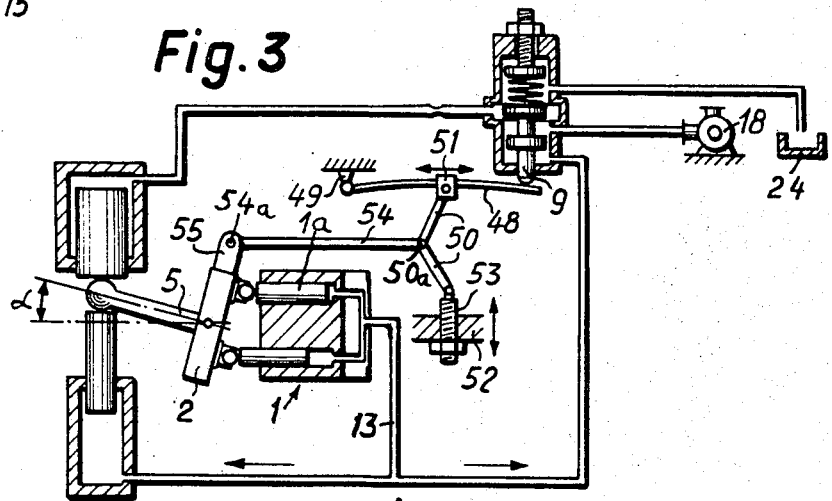
Figure 4:
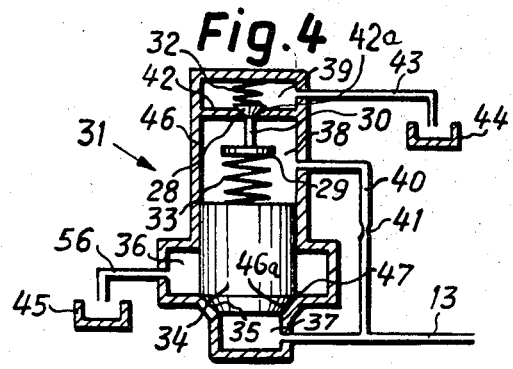

The invention will be better understood, and objects other than those set forth above, will become apparent, when consideration is given to the following detailed description thereof. Such description makes reference to the annexed drawing wherein:

FIGURE 1 schematically depicts in cross-section a first embodiment of inventive control apparatus, here shown employed in conjunction with axial piston pump means;

FIGURE 2 is an enlarged, fragmentary cross-sectional view of the control arrangement or apparatus of FIGURE 1 and depicted in a different position;

FIGURE 3 schematically depicts in cross-sectional view another embodiment of inventive control apparatus; and FIGURE 4 illustrates in cross-sectional view a variant of the inventive control apparatus.

Describing now the drawing, the pump unit or assembly 1 depicted in FIGURE 1 contains a number of peripheral or crown-like arranged axial piston pumps 1a. These cooperate with an inclined plate, hereinafter conveniently termed a swash or wobble plate 2, whereby it is possible to infinitely adjust the piston stroke from zero to a maximum value by carrying out relative pivoting movement between pump unit 1 and swash plate 2. Axial piston pumps of this general type are already well known to the art, as for instance described in British Patent 633,619. To simplify matters, it has been assumed that the pump unit 1 rotates about the pin or shaft 1b, whereas the swash plate 2 is stationarily arranged and is pivotable about the pivot pin 2a. Adjustment of the swash plate 2, which influences the pumping stroke, is undertaken by means of an elongate adjusting lever 5 which encloses an angle $\alpha$ with the longitudinal axis of the aforesaid pump unit 1.

The end 5a of this adjusting lever 5 which is remote or facing away from the swash plate 2 cooperates with two pressure units incorporating two hydraulic adjusting or positioning pistons 3 and 4 arranged at opposite sides of the aforementioned adjusting lever 5. These adjusting pistons 3 and 4 are displaceably mounted in pressure cylinders 15 and 16, respectively. It will be recognized that the adjusting piston 3 advantageously possesses a larger diameter than the adjusting piston 4. With a given position of the adjusting lever 5 and a given rotational speed, the pump unit 1 furnishes a predetermined delivery capacity. Now, if with changing load regulation should occur in such a manner that there results an operating pressure which is as constant as possible, then, while assuming a "constant rotational speed," the stroke of the axial piston pumps 1a must be changed. This can be carried out by rocking or pivoting the adjusting lever 5.

Accordingly, the position of the adjusting pistons 3 and 4 must be altered in order to maintain a constant operating pressure. This takes place by means of a regulating valve means 7 which is subjected via conduit means 13, to the operating pressure of the pump unit 1. Regulating valve means 7 possesses a cylinder 8 in which there is displaceably arranged a piston or spool 6 having a piston rod 9. Piston 6 incorporates two piston discs or lands 10 and 11 interconnected with one another by means of an intermediate member 11a. Cylinder 8 communicates with the delivery side of the axial piston pumps 1a by means of the chamber or compartment 12 thereof located at one side of the piston disc 10 and through the agency of the conduit or conduit means 13. Further, this conduit 13 leads to the cylinder 15 of the adjusting piston 4 and, at this location, opens into a chamber or compartment 15a.

The cylinder 16, in which the adjusting piston 3 is located, possesses a chamber or compartment 16a behind such piston, and into which opens a conduit 17. The other end of this conduit 17 opens into an annulus or ring-shaped compartment 17a located internally of the cylinder 8. The width of the piston disc or land 11 is maintained such that, in the balance or equilibrium condition of the apparatus, it is just able to cover the ring-shaped compartment 17a, in order to interrupt the throughflow connection between the compartment or chamber 16a and the regulating valve means 7. A pump 18, of any suitable construction, delivers pressurized fluid medium via a conduit 19 into a compartment or chamber 20 formed between both of the piston discs 10 and 11. Instead of the provision of a separate pump, such as pump 18, it would also be possible to connect the conduit 19 with the conduit 13.

At both sides of the piston 6 there is located a respective pressure or compression spring 21 and 22. Spring 21 is disposed between the cylinder floor 8a and the end face of the confronting piston disc 11. Spring 22 bears at one end against a spring plate 27 and rests with the other end against a disc or plate 26 which is set upon the piston rod 9. The spring plate 27 bears with a domed or arched portion 27a against the adjustment lever 5 and follows its movement. Upon change of the operating or work pressure which, on the one hand, is propagated via the conduit 13 to the compartment 12 of the regulating valve means 7 and, on the other hand, to the compartment or chamber 15a of the cylinder 15, the force equilibrium is disturbed. If the pressure increases, then, it acts upon the pressure responsive or measuring component, i.e. the piston disc 10 and the piston 6 is raised against the force of the spring 21, so that the lower control edge 11b of the piston disc 11 permits a throughflow of fluid medium or liquid into the conduit 17. As a result, the pressure produced by the pump 18 is increased at the upper end face of the adjustment piston 3, so that the force acting upon such adjustment piston 3 exceeds the counter-force produced by the adjustment piston 4. Consequently, the adjusting lever 5 is pressed downwards, in other words, in the sense of a reduction of the angle α, whereby the stroke of the axial piston pumps 1a is reduced. This brings about a reduction in the pump delivery or capacity and as a consequence thereof a reduction of the pressure.

When the operating pressure drops there occurs a similar correction in the opposite direction in that, the pressure drop once again acts via the conduit 13, on the one hand, at the chamber or compartment 12 and, on the other hand, at the compartment or chamber 15a. As a result, the spring 21 presses the piston 6 downwards until the upper control edge 11c of the piston or plunger disc 11 frees the throughpassage of liquid from the conduit 17. When this happens, this liquid or fluid medium flows out of the compartment or chamber 16a via the conduit 17 into the compartment 28 from where a conduit 23 leads to a supply tank or reservoir 24. As a result, there is a drop in pressure above the adjusting piston 3, and the other adjusting piston 4 which is subjected to the full operating pressure displaces the adjusting lever 5 upwards, in other words, in the sense of increasing the angle α. This brings about an increase in the piston stroke of the axial piston pumps 1a, and the pump capacity or delivery accordingly increases.

FIGURE 2 depicts the apparatus in its equilibrium position, approximately in the null-stroke position, wherein the angle of the adjusting lever 5 is approximately zero. In this position the lower spring 22 is not compressed and its upper end is distanced by the amount of intermediate space 25 from the spring plate 26. During positional change or displacement, the position of the adjusting lever 5 and, therefore, the force relationship at the piston rod 9, is first influenced when the displacement exceeds the magnitude of the intermediate space 25, whereupon, then, a deflection takes place in the previously described manner. In this way, it is possible to prevent a continuous pendulating or hunting of the regulating valve means 7.

As soon as the angle α is so large that the spring 21 can act upon the piston rod 9, the pressure which maintains the system in equilibrium is proportional to the angle of deflection of the adjusting lever 5. Depending upon the chosen relationship between the angular position of the adjusting lever 5 and the selected spring force, it is possible to bring about different correlations between pump delivery and pressure. With axial piston pumps of the aforementioned type it is of practical significance that, by virtue of the variable stroke it is possible to obtain a constant output regulation or control, in which, then, the product of pressure and pump delivery or capacity has a constant value. To this end, there is required an approximately hyperbolic characteristic of the spring force.

FIGURE 3 depicts an embodiment in which this hyperbolic characteristic can be obtained in relatively simple manner. The actual physical construction substantially corresponds to that discussed in conjunction with FIGURE 1, with the difference that instead of the provision of a helical spring 22, here there is provided a blade or leaf spring 48 which cooperates with a toggle lever system 50. The leaf spring 48 is pivotally mounted at a stationary support 49. Transmission of the forces between the toggle lever system 50 and the leaf spring 48 occurs with the aid of a sliding shoe or block 51, which, as generally indicated by the doubleheaded arrow, is displaceably and fixably supported upon the blade or leaf spring 48. The other end of this toggle lever system 50 is hingedly supported by a support means 52, whereby with the assistance of a threaded screw 53 it is possible to bring about regulation of the effective toggle lever length. The central joint or articulation 50a of the toggle lever system 50 is hingedly connected with a push rod 54. The other end 54a of this push rod 54 is articulated with an extension or projection 55 of the swash or wobble plate 2. Instead of the arrangement of the extension 55 at the swash or wobble plate 2 it would also be possible to mount such at the adjusting lever 5. During rocking or pivoting of the swash plate and, therefore, a change of the angle α, the toggle lever system 50 is bent through to a lesser or greater extent, whereby such movement is transmitted to the blade spring 48 which, in turn, transmits a variable force to the piston rod 9. In so doing, the spring force has a hyperbolic characteristic.

A simpler embodiment of the regulating valve means 7 is depicted in FIGURE 4. Insofar as function is concerned, the therein depicted regulating valve means 31 corresponds to the regulating valve means 7 of FIGURE 1. It will be recognized that here such comprises a cylinder 46 internally of which there is located an adjusting piston 34 which is displaceable in axial direction. At one side of this piston 34 there is located a chamber or compartment 37 which is smaller than the diameter of the aforementioned piston 34. The entire compartment located at the other face of the piston 34 is divided into two chambers 38 and 39 by means of the partition plate 42. This plate 42 advantageously possesses a conical aperture or opening 42a with which cooperates a valve plate 28 of a valve unit. Valve plate 28 is rigidly connected via a valve shaft or stem 30 with a pressure responsive or measuring component, namely a spring plate 29.

Between the spring plate 29 and the confronting end face of the piston 34 there is disposed a compression or pressure spring 33 which is therefore situated in the chamber or compartment 38. A pressure or compression spring 32 likewise acts against the upper face of the valve plate 28. This compression spring 32 is located in the chamber or compartment 39 and bears against the floor of the cylinder 36. Piston 23 incorporates a piston seating means, here in the form of a conical portion 35 at the side neighboring the compartment or chamber 37 and which cooperates with an appropriately inclined or conical seat portion 46a of the cylinder bore. Adjacent the upper edge 47 of this conical piston portion 35 there is located, within the cylinder 46, a delivery annulus or recessed chamber 36 which communicates via a delivery conduit 56 with a supply tank or reservoir 45. The chamber 38 communicates via a branch conduit 40 with the chamber or compartment 37. In this conduit 40 there is provided a throttling means or device 41 which throttles the fluid flow through the aforesaid conduit. Consequently, in the equilibrium condition of the system the same pressure exists in the chamber 38 as in the chamber 37.

A pressure increase in the conduit means 13 is effective at the conduit 40 in which there is disposed the throttle device 41. This pressure increase brings about lifting of the valve stem 30 carrying the valve plate 28 and located within the compartment 38. This is so because the force acting at the lower face of the spring plate 29 is larger than the force acting at the upper face thereof, since the lower surface area of the spring plate 29 is larger than the upper area thereof, the latter of which has been reduced by the amount of the cross-sectional area of the valve stem or shaft 30. A portion of the pressurized fluid medium located in the compartment 38 therefore flows through the opening 42a provided in the partition plate 42 into the chamber or compartment 39, flowing from there via a conduit 43 into a supply tank or reservoir 44. Since the further flow of fluid medium from the conduit 13 is limited owing to the throttle mechanism 41, the pressure in the compartment or chamber 38 drops. As a result, the overpressure appearing in the chamber or compartment 37 raises the piston 34 and pressurized fluid medium can escape from the aforesaid chamber 37 into the annulus 36 and from there can move via the conduit 56 into the supply tank 45 until pressure equalization or equilibrium is again restored.

During the upward movement of the piston 34 the spring 33 is pre-stressed stronger, so that the spring force acting upon the spring plate 29 is variable. The force exerted by the compression spring 32 against the valve plate 28 can be assumed to be constant within the limits or framework of the displacement path of this valve plate.

Instead of providing a restoring force by means of springs it would be possible to produce such also in a different manner, for instance through weights or pneumatically. However, for practical reasons springs are preferred.

While there is shown and described present preferred embodiments of the invention it is to be distinctly understood that the invention is not limited thereto but may be otherwise variously embodied and practiced within the scope of the following claims. Accordingly, what is claimed is:

1. A hydraulic control apparatus comprising regulating means, said regulating means including a measuring component, adjusting means operably influenced by said regulating means, means for continuously applying the operating pressure to both said adjusting means and said measuring component, means for applying a restoring force to said measuring component which opposes the operating pressure, said adjusting means including movable means for changing the magnitude of said restoring force in dependency upon the position of said movable means, wherein said restoring force applying means incorporates spring means acting in opposite directions upon said measuring component.

2. A hydraulic control apparatus as defined in claim 1, wherein the pre-stress of one spring means is variable at least throughout a portion of the stroke of the pump means.

3. A hydraulic control apparatus as defined in claim 2, wherein said spring means possess a spring characteristic substantially corresponding to a predetermined control characteristic.

4. A hydraulic control apparatus as defined in claim 2, wherein said spring means are selected such that said pump means with constant rotational speed delivers an adjustable approximately constant output which is defined by pressure and delivered capacity.

5. A hydraulic control apparatus as defined in claim 1, said regulating means including a cylinder and a piston means displaceable in axial direction within said cylinder, said piston means dividing said cylinder into at least two cylinder chambers, said operating pressure applying means including conduit means communicating with one of said cylinder chambers, said adjusting means incorporating two pressure units embodying piston and cylinder means effectively in opposite directions, a pivotally mounted adjusting member for influencing the stroke of said pump means cooperating with said two pressure units, said conduit means further communicating with one of said pressure units to apply the operating pressure thereto, a conduit connecting the other of said pressure units with said cylinder of said regulating means such that said piston means thereof obturates said conduit during the equilibrium condition of the apparatus, and during the non-equilibrium condition said piston means of said regulating means frees said conduit for passage of pressurized fluid medium, said restoring forces applying means including a first compression spring situated in the other of said cylinder chambers and acting upon said piston means of said regulating means, a second compresssion spring located between said adjusting member and said piston means of said regulating means, said second compression spring opposing said first compression spring, the pre-stress of said second compression spring being variable at least throughout a portion of the stroke of the pump means.

6. A hydraulic control apparatus as defined in claim 5, wherein said piston means of said one pressure unit to which there is applied operating pressure via said conduit means possesses a smaller diameter than said piston means of said other pressure unit.

7. A hydraulic control apparatus as defined in claim 5, further including toggle lever means disposed between said adjusting member and said second compression spring, rod means acting upon said toggle lever means and influencing bending of said toggle lever means as a function of the position of said adjusting member.

8. A hydraulic control apparatus as defined in claim 1, said regulating means including a cylinder and a piston means displaceable in axial direction, said piston means dividing said cylinder into at least two cylinder chambers, said operating pressure applying means including conduit means communicating with one of said cylinder chambers, said conduit means including a branch conduit communicating with the other of said cylinder chambers, a throttle mechanism provided for said branch conduit, valve means including a valve stem located in said other cylinder chamber, said restoring force applying means including a first compression spring for loading said valve stem, a second compression spring located at the opposite side of said valve means and opposing the action of said first compression spring, and fluid discharge means controlled by the position of said piston means and capable of discharging pressurized fluid medium from said one cylinder chamber.

9. A hydraulic control apparatus as defined in claim 8, wherein the end of said piston means neighboring said one cylinder chamber is provided with inclined seating means, said cylinder including an inclined seat portion for receiving said piston seating means, said fluid discharge means embodying a discharge chamber within said cylinder adjacent said inclined seat portion thereof and a discharge conduit communicating with said discharge chamber.

References Cited
UNITED STATES PATENTS

| | | | |
|---|---|---|---|
| 2,436,242 | 2/1948 | Aspelin | 137—489 |
| 2,453,538 | 11/1948 | Rauch | 103—161 |
| 2,573,231 | 10/1951 | Teague | 137—489.3 |
| 2,971,498 | 2/1961 | Bloch | 103—162 |
| 3,107,632 | 10/1963 | Wahlmark | 103—162 |
| 3,213,805 | 10/1965 | Cooper | 103—162 |
| 3,232,238 | 2/1966 | Faisandier | 103—162 |
| 3,250,227 | 5/1966 | Kouns | 103—162 |
| 3,302,585 | 2/1967 | Adams | 103—38 |

ROBERT M. WALKER, *Primary Examiner.*